Sept. 20, 1938.   H. O. PETERSON   2,130,675
ANTENNA SYSTEM
Filed March 3, 1936   2 Sheets-Sheet 1
Fig. 1
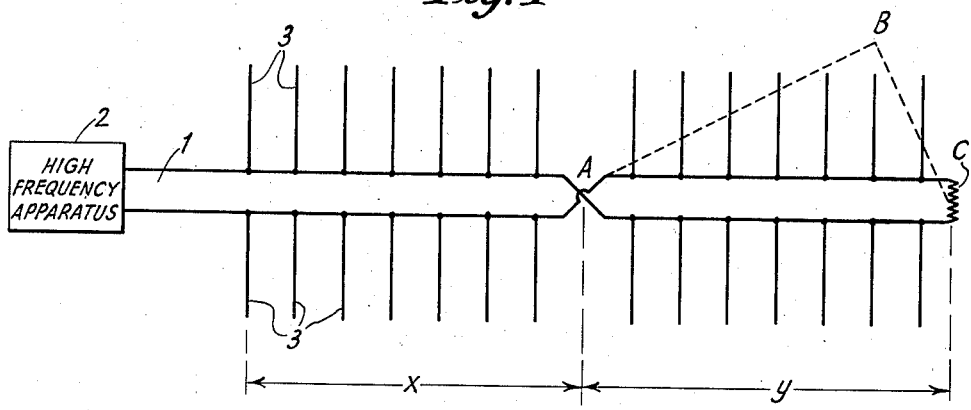
Fig. 2
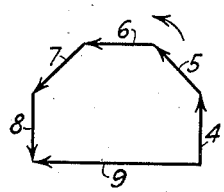
Fig. 4
Fig. 3
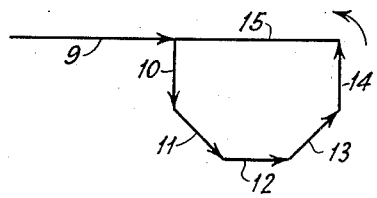
Fig. 5
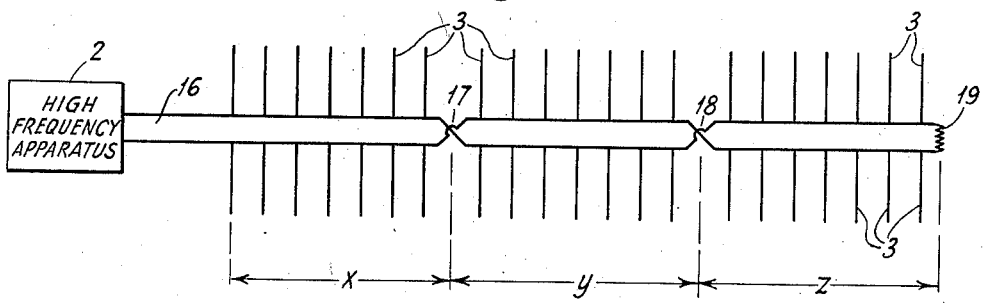
INVENTOR.
HAROLD O. PETERSON
BY
ATTORNEY.

Sept. 20, 1938.  H. O. PETERSON  2,130,675
ANTENNA SYSTEM
Filed March 3, 1936   2 Sheets-Sheet 2
Fig. 6
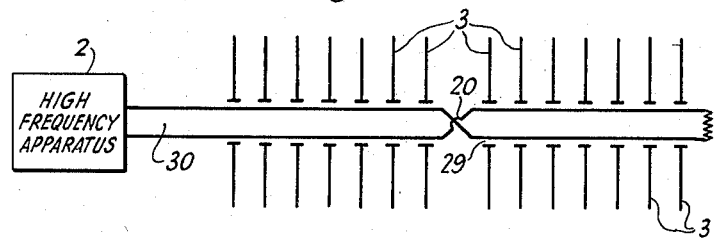
Fig. 7
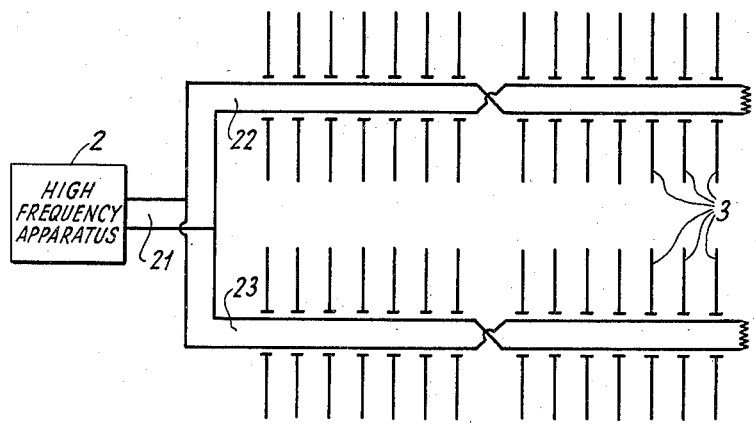
Fig. 8        Fig. 9        Fig. 10
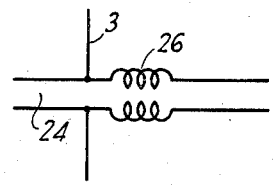   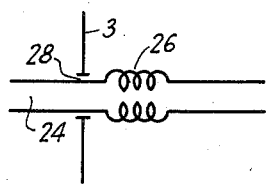   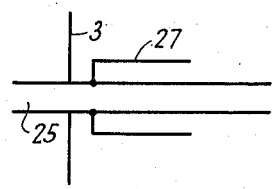
Fig. 11
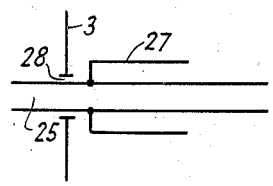
INVENTOR.
HAROLD O. PETERSON
BY
ATTORNEY.

Patented Sept. 20, 1938

2,130,675

UNITED STATES PATENT OFFICE 2,130,675

ANTENNA SYSTEM

Harold O. Peterson, Riverhead, N. Y., assignor to Radio Corporation of America, a corporation of Delaware Application March 3, 1936, Serial No. 66,816

3 Claims. (Cl. 250—11)

This invention relates to improvements in directive antenna systems, and more particularly to such of these systems as are commonly known by the term "fishbone" antenna because of their physical configuration. Such a "fishbone" type of antenna, upon which the present invention is an improvement, is described in my United States Patent No. 1,821,402, granted September 1, 1931.

In general, the "fishbone" antenna is used in receiving signals on short waves and comprises a two-wire feeder line to which are coupled transversely a number of doublets or pick-up units. These doublets apply the received energy to the feeder wires at phase displacements approximating those of the wave travelling in space whereby the energy from the doublets add cumulatively in proper phase. The doublets are preferably closely spaced relative to the length of the communication wave and coupled to the feeder wires either directly or through high impedances. A type of coupling which has been found satisfactory is the capacitance coupling, and United States Patent No. 1,908,536, granted May 9, 1933, describes a type of coupling condenser commonly used in this type of antenna. For obtaining unilateral directivity, it is customary in the "fishbone" antenna to close the end of the two wire feeder line nearest the remote station with which it is desired to communicate by a resistance whose value is equal to the surge impedance of the feeder line with its associated equipment, including doublets etc. The surge resistance at the end of the feeder line fairly effectively prevents reception of signals from a direction opposite to that from which the desired signals emanate.

Although the "fishbone" antenna is herein described especially with reference to a receiving system, it is to be understood that its use is not limited thereto since it may also be used for transmitting purposes.

It has been the practice to have the feeder line of the "fishbone" antenna arranged horizontally and pointed directly at the remote station with which it is desired to communicate, and to limit the overall length of the system to such values that the electrical length of the antenna feeder line is approximately one-half wavelength longer than the length of the projection of the antenna feeder upon a line parallel to the direction of propagation of the electromagnetic wave front. Such an arrangement, it has been found, does not readily receive waves whose directions of propagation differ considerably from the direction of the extension of the antenna feeder line. It is especially difficult with this type of antenna to receive efficiently, waves whose directions of propagation are inclined at angles differing considerably from a direction parallel to the surface of the earth.

The present invention, among other things, overcomes the above mentioned difficulties and enables the reception of waves whose directions of propagation are not parallel to the direction of the antenna feeder line. In brief, the results of the invention are achieved by reversing the polarity of the antenna feeder line at one or more points intermediate the ends of the antenna system, for obtaining a greater resultant voltage for utilization purposes. In the case of a receiving antenna designed in accordance with the invention, the increments of voltage along the feeder, due to the waves received from a desired direction, will add in phase along the feeder line to produce a resultant voltage of optimum magnitude.

The following is a detailed description of the invention in conjunction with drawings, wherein:

Fig. 1 illustrates, schematically, a simple embodiment of a "fishbone" antenna embodying the principles of the invention;

Figs. 2, 3 and 4 are vectorial representations of how a resultant voltage is built up along the antenna feeder line in accordance with the invention;

Figs. 5, 6 and 7 illustrate, schematically, various embodiments of the invention; and Figs. 8, 9, 10 and 11 illustrate the details of different coupling arrangements for altering the velocity of the energy in the feeder line.

Referring to Fig. 1, there is shown a "fishbone" antenna comprising a closely spaced two-wire horizontal feeder line 1, connecting high frequency apparatus 2, herein conventionally shown in box form, with externally arranged antenna doublets 3, 3. These doublets are disposed along the length of the feeder wire, there being preferably at least six to each wavelength of feeder line. The doublets may be oriented at any angle with respect to the plane of the drawings. Feeder 1 is terminated at its far end by a surge impedance C of a value equaling the surge impedance of the line as loaded by the antenna doublets. The antenna is divided into two sections X and Y connected end to end with a reversal of the feeder line at A to produce a change of 180° of electrical phase in the feeder line.

The manner in which the invention functions will now be described: Assuming that the antenna is used for receiving purposes, then the feeder line 1 is disposed in the general direction of the transmitter from which it is desired to receive signals, and at some elevation above ground. If short waves are being received, the wave front of the incoming signals will arrive over a path inclined to the horizontal by some angle such as BAC, provided the direction of propagation of the received electromagnetic waves is parallel to the broken line BA. In such case the projection of the antenna feeder upon a line parallel to the direction of propagation of the received electromagnetic wave front will be the distance AB. The antenna is designed to give AC an electrical length which is approximately one-half wavelength longer than the distance AB. To put it another way, the projection of the antenna feeder upon a line parallel to the direction of the electromagnetic wave propagation is substantially one-half wavelength less than the electrical length of the antenna feeder which provides the projection. By the term "electrical length" it is to be understood, is meant the physical length multiplied by the velocity of light divided by the phase velocity of electrical propagation along the feeder line. In a typical case, the phase velocity in the antenna feeder line might be 70 or 80 percent of the velocity of propagation of light in free space. The energy received by the doublets or pick-up units 3, 3 as the received wave progresses in space over the antenna from surge impedance C toward the receiver 2, will produce voltages on feeder line 1 which will build up a resultant voltage.

Fig. 2 illustrates the manner in which the successive voltages produced in the feeder line 1 by successive pick-up units tend to add in magnitude. Vectors 4, 5, 6, 7 and 8 represent voltages produced in the feeder line by the successive electromagnetic wave coupling elements 3, 3. As the electromagnetic wave advances in space toward the receiver, it induces successively, voltages in doublets 3, 3 which contribute increments of voltage, herein represented by vectors 4, 5, 6, 7 and 8, to the antenna feeder line 1. These increments of voltage progress along the feeder at a velocity generally slower than the velocity of propagation of the electromagnetic wave front in space. Consequently, as the wave front advances, the resultant of earlier components of voltage in the antenna feeder line lag farther and farther behind the phase of the latest increment induced by the electromagnetic wave front. The magnitude of the resultant voltage, however, increases until it falls 90° behind the phase of the latest induced increment of voltage, as, for instance, the relationship between resultant 9 and the latest increment of voltage 8. If the antenna is made longer the resultant voltage will commence to build down rather than increase with length of antenna. At this point, according to this invention, the polarity of the antenna feeder is reversed (i. e., the positions of the conductors of the feeder are transposed) as indicated by A on Fig. 1. This serves to turn the resultant voltage through 180° of electrical phase as is indicated by 9 in Fig. 3. To this resultant 9 more increments of voltage may then be added by the advancing of the electric wave front as is shown diagrammatically in Fig. 4. In Fig. 4 increments 10, 11, 12, 13 and 14 combine to form a resultant 15 which adds in phase with the previous resultant 9 to obtain a very decided effectiveness for the antenna system when the electromagnetic wave front is progressing in the direction AB.

This optimum building up of the various increments of voltage will only occur for a wave front advancing in the desired direction and consequently wave fronts in undesired directions may be discriminated against. In the case of Fig. 1, we may consider the direction parallel to AB as being the optimum direction. The arrows of Figs. 2, 3 and 4 indicate the direction of positive phase rotation.

The point at which to make the phase reversal may be calculated for any assumed angle of arrival if we know the phase velocity of the antenna bus. The phase velocity may be calculated from the distributed constants of the antenna bus, there being well-known transmission line formulas covering this calculation. We can also measure the phase velocity of the antenna bus by producing a standing wave thereupon and measuring the frequency of oscillation producing said standing wave and the distance between nodes on the antenna bus. From the measurement of frequency we calculate the free space wavelength of the standing wave. From the distance between nodes on the bus we determine the apparent electrical wavelength of the oscillation on the bus; the ratio of the latter to the former being the phase velocity.

It should also be observed that in the case of Fig. 1, a wave front advancing in a direction parallel to the surface of the earth but at a horizontal angle equal to angle BAC with respect to the direction of the antenna feeder 1, will also build up a resultant approaching the optimum in magnitude. Consequently, the antenna system of the invention will have a response diagram or directive pattern similar in shape to a section of a hollow cone when considered in free space, whereas the pattern of the system of my United States Patent No. 1,821,402, supra, has maximum response for the direction parallel to the antenna feeder. However, the reflection of electromagnetic waves from the surface of the earth tends to cancel the components arriving over very low angles so most of the response of this system will be for the higher angles and optimum results will be along a direction parallel to AB. The directivity of the individual wave coupling elements 3, 3 will also assist in making this antenna system highly directive. Resultant voltages which build up for signals coming from the reverse direction will reach the surge impedance C and dissipate their energy therein. Consequently, by this means the antenna system is made to have a unidirectional characteristic.

Fig. 5 shows a modification of the system of Fig. 1 wherein three sections X, Y and Z of antenna and feeder line are employed. In this figure, high frequency apparatus 2 connects with the antenna elements through feeder line 16 which reverses itself at 17 and 18 in accordance with the teachings outlined above. The usual surge impedance 19 terminates the line in the same manner described above in connection with Fig. 1.

Fig. 6 discloses a further embodiment which differs from the system of Fig. 1 only in the manner in which the pick-up units or doublets 3 are coupled to the feeder line. In this case the feeder line is reversed at 20 and the doublets are connected thereto through condensers 29. By proportioning the magnitude of the coupling condensers 29 and the lengths of the wave coupling elements 3, the phase velocity of the antenna feeder line 30 may be governed within desired limits.

Fig. 7 discloses another modification wherein there are shown two antenna systems side by side and connected in proper phase relationship by means of feeder lines 22 and 23 coupled to a common transmission line 21 which connects the antenna systems with radio frequency apparatus 2. Except for the manner of coupling both antennas to the common transmission line, each antenna of this figure is similar to that shown in Fig. 6. It will be understood, of course, that if desired the electromagnetic wave coupling elements 3 of this system of Fig. 7 may be coupled to the feeder lines 22 and 23 in the same manner as shown in Figs. 1 and 5 instead of through the condensers.

Figs. 8-11, inclusive, show different ways of coupling the doublets 3 to the transmission line and of adjusting the phase velocity of the feeder line within desired limits. In Fig. 8 the doublet 3 is connected directly to the antenna feeder 24 and the feeder line is provided with series inductance elements 26 on both sides of the line, the effect of which in a transmission line is well known in the art. Generally, coils 26, used in series in both sides of the line, would have low inductance values in an antenna of this type, but, on occasion, it might be desirable to make these inductance values so large as to comprise a capacitive reactance at the frequencies involved. This also applies to Fig. 9 which differs from Fig. 8 only in the manner of coupling the doublets 3 to the line 24. In this last figure, coupling condensers 28 are employed. In Figs. 10 and 11 the phase velocity of the antenna wire 25 is adjusted by loading the line with parallel sections of wire 27. These added sections of wire provide mutual capacitance between each other and also a capacitance to ground. Fig. 10 shows that antenna doublet 3 may be connected to the line directly, and Fig. 11 shows that, if desired, the same may be coupled to the line 25 by means of coupling condenser 28.

Although the electromagnetic wave coupling doublets 3 have been shown and described in the foregoing specification as being connected directly or through condensers to the feeder line, it should be understood that the invention is not limited to such manner of coupling since, if desired, in special instances, the antenna doublets may be connected to the line through series resistors or series inductances, or other combinations of impedances, as adequately illustrated in some cases in my United States Patent No. 1,821,402, supra. Similarly, the antenna doublets or pick-up units in the antenna systems above described are not limited to any particular angle with respect to the surface of the earth since they may be horizontal, vertical, or at any angle with respect to the earth. Nor is it essential that the antenna doublets be perpendicular to the antenna feeder line as they may, in some certain special cases, be oriented at some other angle with respect to the antenna feeder line.

In using the antenna system of the invention, it is believed that the general practice will be to dispose the antenna feeder line in the general direction of the other end of the radio circuit, but it is to be distinctly understood that the invention enables optimum reception from two different directions disposed perhaps 20° to 40° apart, if proper design constants are chosen, and consequently, if desired, the antenna feeder line may be disposed along the line mid-way between the two directions over which it is desired to communicate by electromagnetic wave propagation.

What is claimed is:

1. A directive antenna system for short waves comprising two closely spaced, substantially straight feeder conductors connected to high frequency translating apparatus, a plurality of groups of antenna units transversely coupled to said line, there being at least six of said antenna units per wave length of line for the operating frequency to each group, the polarities of said conductor being reversed between two groups of said antenna units for producing along said feeder a reversal in phase of the energy in said line, and an impedance connected across the end of said line farthest away from said high frequency translating apparatus, said impedance having a value equal to the surge impedance of said line as loaded by said antenna units.

2. A directive receiving antenna for short waves comprising a pair of relatively closely spaced conductors which are linear and continuously conductive throughout their length and form a feeder line extending generally in the direction of desired reception, a plurality of groups of signal energy pick-up units coupled to said line along the length thereof, there being at least six pick-up units per wavelength of line for the operating frequency to each group, each of said units having two arms connected to opposite conductors of said feeder line, an impedance equal to the surge impedance of the system connected across that end of the transmission line which is nearest the desired transmitting station, and means for producing at a particular point along said line a reversal of substantially 180° in the phase of the resultant voltage applied to said line by said pick-up units.

3. A directive antenna system comprising a two conductor feeder line connected to high frequency translating apparatus, a plurality of groups of antenna units transversely coupled to said line, there being approximately not less than six antenna units per wavelength of line for the operating frequency, the conductors of said line being reversed between adjacent groups of antenna units for producing in said line a reversal in phase of the energy in said line, the electrical length of any section of said feeder line between any two adjacent reversals being approximately one-half wavelength longer than the projection of said section upon the direction of propagation of the electromagnetic waves.

HAROLD O. PETERSON.